F. P. WEIGEL.
HORSE'S NOSE PROTECTOR OR SHIELD.
APPLICATION FILED OCT. 17, 1918.
1,311,933.
Patented Aug. 5, 1919.
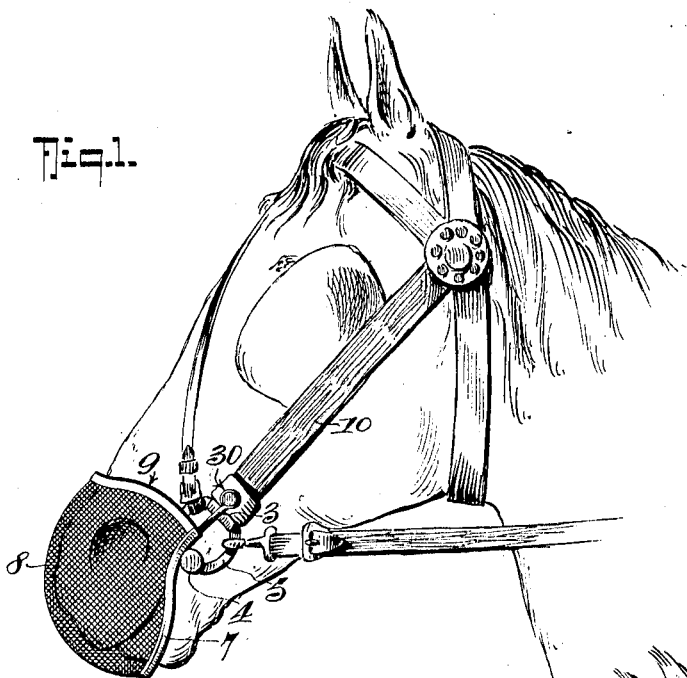
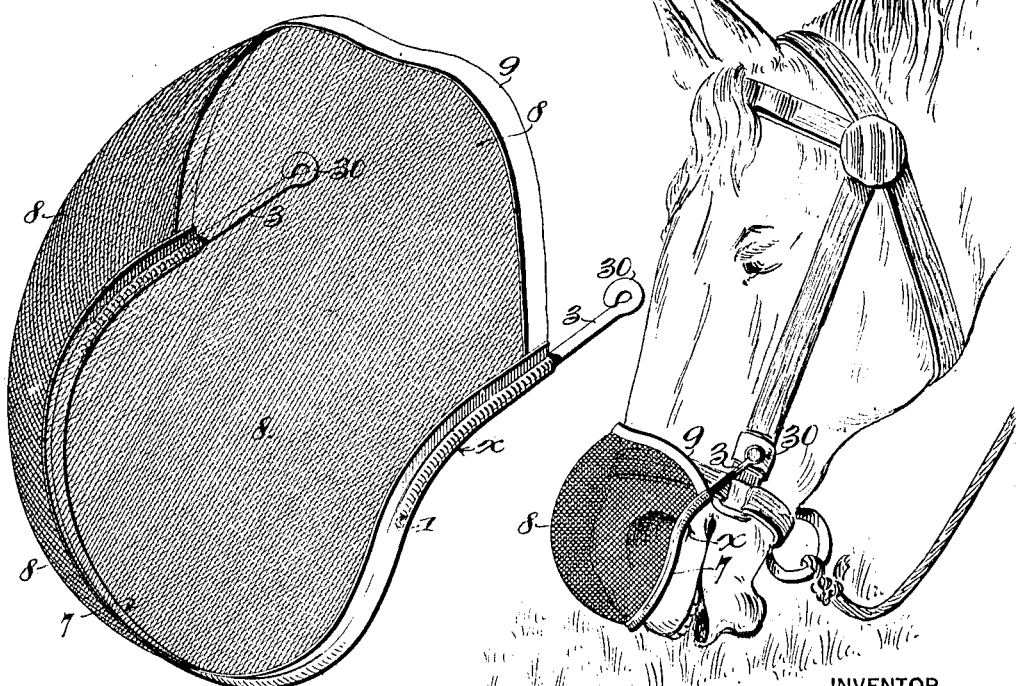
INVENTOR
Frank P. Weigel.
BY
Fred G. Dieterich
ATTORNEYS

UNITED STATES PATENT OFFICE.

FRANK P. WEIGEL, OF FLANDREAU, SOUTH DAKOTA.

HORSE'S NOSE PROTECTOR OR SHIELD.

1,311,933.  Specification of Letters Patent.  Patented Aug. 5, 1919.

Application filed October 17, 1918. Serial No 258,490.

*To all whom it may concern:*

Be it known that I, FRANK P. WEIGEL, a citizen of the United States, residing at Flandreau, in the county of Moody and State of South Dakota, have invented certain new and useful Improvements in Horses' Nose Protectors or Shields, of which the following is a specification.

This invention is a device that is particularly designed for being attached to the ordinary types of bridles and halters to serve as an effective ventilated shield for protecting the animal's nostrils, mouth and lower jaw against bot flies and other insects that frequently attack the nose of an animal with objectionable consequences.

Among other objects, my invention has for its purpose to provide a shield of the character stated of a very simple and inexpensive construction, that can be effectively and quickly attached to the bridle or halter, that will effectively protect the nose of the horse and prevent the flies from bothering him while at work.

Another and essential feature of my invention is to provide a shield for protecting the horse's nose, mouth and lower jaw so constructed and adapted for being connected to a bridle or halter, that the shield may be readily attached to extend over and protect the nostrils, mouth and lower jaw, and when in such adjustment to protect the horse while at work and which can likewise be adjusted with respect to the nose of the animal for permitting the horse to graze or eat.

Heretofore devices of the general character stated have been provided in which the shield or protecting element, when once adjusted over the horse's nose, is held in a relatively stationary position, and when it is desired to allow the horse to pasture or eat during the working period, it has been usually necessary to remove the entire device from the head of the horse and often to remove the entire bridle when the shield is not being used.

My invention avoids the objectionable features incident in the use of the common type of nose shield and my said invention embodies in a device of the character stated certain features of construction and novel arrangement of parts that will be first described in detail, specifically pointed out in the appended claims and illustrated in the accompanying drawing, in which:

Figure 1 is a perspective view of my protecting appliance, the same being shown on a horse's head and positioned for covering the nostrils, mouth and the lower jaw of the horse while at work.

Fig. 2 is a similar view which shows my invention as connected with a halter and positioned to expose the lower jaw and the mouth whereby to allow the horse to graze or eat.

Fig. 3 is a perspective view of my improved device.

In carrying out my invention the shield or protector includes a rigid bottom formed of a stiff wire rod 1 that is bent into a substantially U shape, whose opposite side portions continue as extensions 3—3, the outer ends of which are bent upon themselves to constitute eyes 30—30, the purpose of which will presently appear.

The said side portions, just in advance of the beginning of the extensions 3—3, are curved upwardly so that, when the shield is positioned over the horse's nose, as shown, the said sides extend over and clear the bit ends 4 and the bit rings 5—5.

Along the front and sides of the wire rod 1, up to the point to where the extensions begin, is attached a rim portion 7, preferably of sheet metal that is bent upon itself and constitutes a hem between which the lower edge of the ventilated or screen wire shield 8 is stitched or otherwise secured.

The ends of the hem 7 connect with a transverse arched shape flexible hem 9 that is formed of stout canvas folded upon itself and is stitched to constitute the hem for the front edge of the shied as shown.

In practice, the several parts that constitute my improved shield or protector, are so proportioned that the ventilated shield member 8, when the device is at the lowermost adjustment, as shown in Fig. 1, will extend over the nostrils, mouth and the lower jaw of the animal, at which position the device is held in the manner to be presently stated, and at this point it should be mentioned that my device when once applied for use is not to be removed or disconnected, it being adapted for such adjustment that the lower edge of the shield can be readily lifted to a point sufficiently above the mouth when the horse is grazing or eating.

By reason of forming the shield as shown and described and particularly extending the ends of the rods 1 and pivotally sustaining such ends on the bridle or halter so that the shield will freely drop down over the nose of the animal, as shown in Fig. 1, when the horse lowers his head to eat, as in Fig. 2, it causes the lower edge of the shield to touch the ground and, as the horse then moves his mouth backward, it clears the lower edge of the shield and thereby gives the horse sufficient freedom for grazing or eating, it being understood that, when the horse again raises his head, the front edge of the shield will drop back in the position shown in Fig. 1.

What I claim is:

1. A fly shield for horses comprising a supporting rod of substantially U-shape and bent to pass below the horse's mouth, a screen fabric secured to the said rod and shaped to fit over the nostrils of a horse, and a flexible arch, the ends of which are secured to the said U-shaped rod and to which flexible arch the screen fabric is also secured, the ends of the U-shaped rod being projected to form pivot members by which the shield may be pivoted to the head harness and to gravitate over the horse's mouth.

2. A fly shield comprising a substantially U-shaped supporting rod, a screen body shaped to fit over the horse's nostrils, mouth and lower jaw, an arch-shaped member connected at its ends to the side portions of the U-shaped rod, the said member consisting of a flexible substance that constitutes a hem for the upper edge of the screen body, means for connecting the lower edge of the screen body to the U-shaped rod, the said arms of the latter forming extensions, and means for pivotally connecting the ends of the said extensions to the head harness, whereby to permit of adjustment of the lower edge of the shield to a point below the horse's mouth when working the horse and above the mouth to permit the horse to graze or eat.

3. A fly shield comprising a substantially U-shaped supporting rod, a screen body shaped to fit over the horse's nostrils, mouth and lower jaw, an arch-shaped member connected at its ends to the side portions of the U-shaped rod, the said member consisting of a flexible substance that constitutes a hem for the upper edge of the screen body, means for connecting the lower edge of the screen body to the U-shaped rod, the said arms of the latter forming extensions, and means for pivotally connecting the ends of the said extensions to the head harness, whereby to permit adjustment of the lower edge of the shield to a point below the horse's mouth when working the horse and above the mouth to permit the horse to graze or eat, the side portions of the said U-shaped rod being bent upwardly near their outer ends, whereby the said rod can fit over and clear the bit and the bit ring when the shield is applied.

4. As a new article of manufacture, a fly shield for horses comprising a substantially U-shaped supporting rod, a screen body shaped for fitting over the horse's nostrils, mouth and lower jaw, and an arch-shaped member connected at its ends to the opposite arms of the U-shaped rod, the said member consisting of a flexible substance that is attached to one edge of the screen body, the said side arms of the U-shaped rod being extended beyond the arch member and having their ends terminating in eyes, the said eyes on the side arms providing for pivotally and adjustably connecting the shield to the horse's head harness.

5. A bridle or halter harness in combination with a fly shield comprising a substantially U-shaped rod, a screen body attached to the rod to normally fit over and below the horse's nostrils and mouth and means for pivotally sustaining the said shield from the bridle or halter harness, so constructed and arranged that when the horse lowers his head to eat, the front lower edge of the shield will engage the ground and be thereby lifted to a point above the horse's mouth.

FRANK P. WEIGEL.

Copies of this patent may be obtained for five cents each, by addressing the "Commissioner of Patents, Washington, D. C."